Patented Apr. 10, 1928.

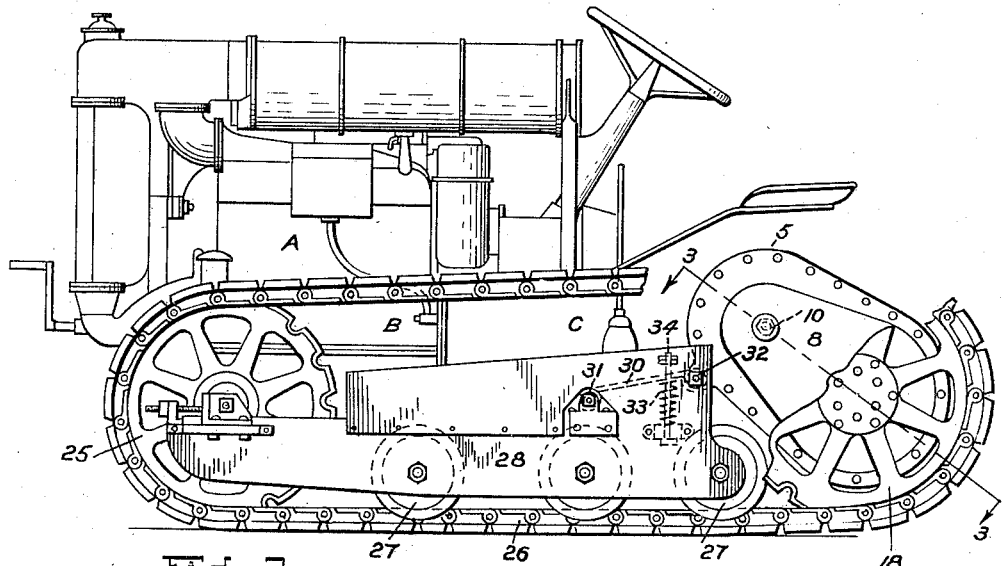

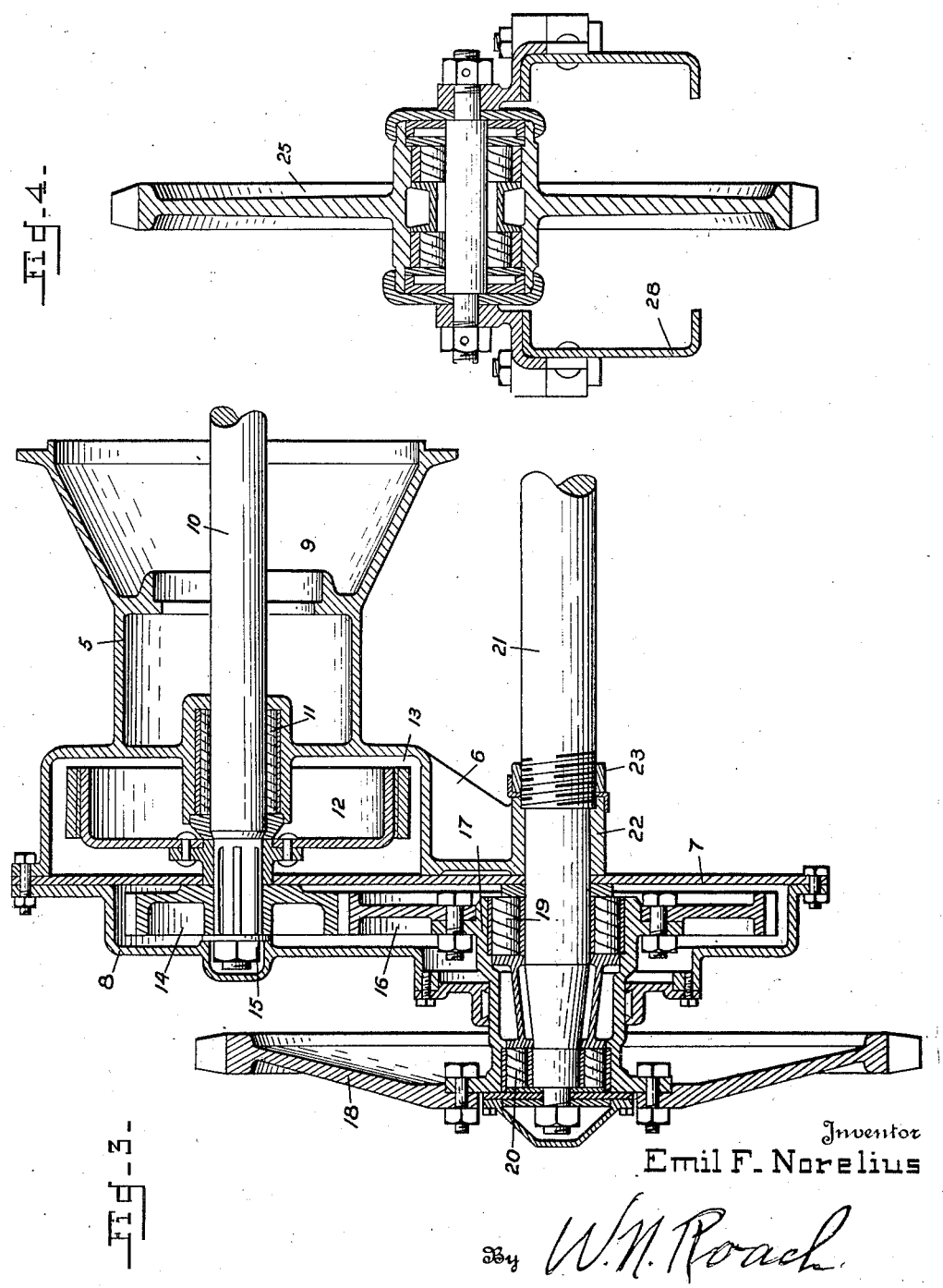

1,665,470

UNITED STATES PATENT OFFICE.

EMIL F. NORELIUS, OF DAVENPORT, IOWA.

REAR-END ASSEMBLY FOR POWER-DRIVEN VEHICLES.

Application filed November 6, 1925. Serial No. 67,418.

(GRANTED UNDER THE PROVISIONS OF THE ACT OF MARCH 3, 1883, 22 STAT. L., 625.)

This invention relates to a rear end assembly for power driven vehicles and is particularly designed for use in tractors which may utilize wheel or belt traction, one form being readily substituted for the other.

In devising the present construction for original application to tractors, particular attention has been directed to the specific adaptations of the rear assembly to existing types of tractors, where, especially in converting a wheeled tractor, such for example as the Fordson, into a belt or track laying tractor, it is desirable to accomplish the transition by substituting a rear assembly without interfering with the standard characteristics of the vehicle and without requiring undue modification, if any, of the power connections. This latter is dependent upon the type of differential employed and it may be necessary to substitute for instance, a controlled differential or steering clutch whereby provision for steering the track laying vehicle may be incorporated in the central control unit. With a view principally to creating from commercial wheeled tractors, either through modified or direct interchangeability, a potential reserve of track laying tractors applicable especially for military use, the present invention assumes its form.

This invention to be disclosed will deal fundamentally with the rear assembly housings and the final reduction units of the power transmission, the assumption being made for the sake of clarity that a central control unit capable of effecting steering of parallel self-laying tracks may, without disadvantage, be initially incorporated or substituted in lieu of the conventional differential between the main drive shaft and the driven counter-shafts of the commercial wheeled tractor.

According to the invention, I provide specially designed axle housings securable to the housing of the central control unit and containing the final drive units. The outer extremities of the housings are rearwardly inclined and carry a through shaft for supporting the driving wheels or the track drive sprockets, the central portion of the shaft being properly bracketed to form a draw bar for coupling a trailed vehicle. Within the housings adjacent the wheels or sprockets are mounted brake drums to assist in steering and for use as service brakes. The housings also serve as an attachment for the truck frames, the connection being so arranged as to provide a yieldable suspension for the rear of the chassis unit.

To these and other ends, my invention consists in the construction, arrangement, and combination of elements, described hereinafter and pointed out in the claims forming a part of this specification.

A practical embodiment of the invention is illustrated in the accompanying drawings, wherein:

Fig. 1 is a view in side elevation, parts removed, of a track laying tractor embodying the features of construction forming the subject matter of this invention;

Fig. 2 is a rear view thereof, showing in dotted lines the form of axle housings in a Fordson tractor;

Fig. 3 is a sectional view on the line 3—3 of Fig. 1;

Fig. 4 is a sectional view through the front idler; and

Fig. 5 is a detail view showing the forward suspension.

Referring to the drawings by characters of reference:

In constructing an original vehicle capable of conversion from wheel to belt traction and vice versa or in providing conversion units susceptible of adaptation to existing tractors, a consideration of the rear assembly need only be involved. In the drawings, the Fordson tractor has been used as a basis for application of the improved rear assembly, and there is shown the conventional body of the tractor consisting of the engine A and crank case B, to both of which is secured the transmission housing C, which extends to the rear of the vehicle and terminates in the differential housing C', flanged for attachment of the rear axle housings D (shown in dotted lines in Figure 2) which inclose the axle shafts on which the rear wheels are directly mounted.

So much of the conventional track as has been described excepting the axle housing D is retained in the contemplated design of an original tractor embodying the improved rear assembly, the adaptability of the new units being readily apparent.

In the present construction, axle housings 5 which may be readily substituted for the housings D and are attachable to the central differential housing C' in the same manner, to terminate in rearwardly inclined portions 6, the whole outer end being closed by an end plate 7 which serves with a cap plate 8 to define a casing for the final drive units. Each housing is formed adjacent its inner end with an annular seat 9 for supporting a central control unit (not shown) such as a controlled differential or steering clutch which is disposed within the central housing C'. Extending from either side of the control unit are the counter-shafts 10 supported adjacent their outer ends in a bearing 11. A brake drum 12 disposed in a dry pocket 13 and a pinion 14 disposed in the casing for the final drive unit are keyed on the shaft 10 where they are held in place by a nut 15. The brake is to be used as a service brake and to assist in steering when the central control unit includes clutch mechanisms.

The pinion 14 meshes with a reduction gear 16 which is secured to a sleeve hub 17 carrying the track drive sprocket 18, or, if desired, a road wheel (not shown). Instead of the gear drive 14—16 a chain drive might be used. The sleeve hub 17 is mounted on roller bearings 19—20 carried on each end of a through shaft 21 which spans the opposite inclined portions 6 passing through bearings 22 therein and held by lock nuts 23. A draw bar bracket 24 placed centrally of the through shaft may or may not be attached to the central housing C'.

The track laying unit for each side of the vehicle consists of the drive sprocket 18 and front idler 25, about which is driven a track 26 having the customary inner rail on which run the supporting rollers 27. These rollers are carried in a truck frame 28 which also carries the front idler 25.

The forward end of the chassis (Fig. 5) is flexibly suspended on a leaf spring 29 whose ends are attached to the inner side of the truck frame 28. The frame is held in its correct relative position with the chassis through a link 30 which at one end is pivoted in a bearing 31 to the frame and at the other end to a bearing 32 on the forward under side of the axle housing 5. A spring 33 on a pilot rod 34 is confined between the frame and the link and provides a yielding suspension for the rear of the vehicle.

The adaptation of the present construction to the Fordson tractor will be readily apparent. By lowering the supporting axle of the drive sprocket and displacing it to the rear track laying units having parallel reaches of proper effective length may readily be substituted for the road wheels of the commercial tractor.

If instead of replacing the track drive sprockets with road wheels, it should be desired to mount road wheels of greater diameter, the entire final reduction unit and its casing could be removed from the axle housing to permit such wheels to be mounted directly on the counter-shafts 10 which could be lengthened accordingly.

While in the foregoing there has been illustrated and described such combination and arrangement of elements as constitute the preferred embodiment of my invention, it is nevertheless desired to emphasize the fact that interpretation of the invention should only be conclusive when made in the light of the subjoined claims.

I claim:

1. In a vehicle, a rear assembly embodying axle housings adapted to be secured one to each side of a central power control unit housing, said housings formed with a rearwardly inclined portion having a bearing and an end plate, and end cap attached exteriorly of the plate to form a final drive casing, countershafts within the housings, a brake drum fixed on each shaft adjacent its outer end and disposed within the housing, a pinion fixed on each shaft and disposed in the final drive casing, a through shaft spanning the inclined portions and mounted in the bearings thereof, sleeve hubs on the extremities of said shaft, and a pair of wheels carried by each hub, one being a gear disposed within the final drive casing and meshing with the pinion on the countershaft and the other being a track drive sprocket, and means whereby a supporting truck frame may be attached to each axle housing.

2. In a vehicle, a rear assembly embodying axle housings adapted to be secured one to each side of a central power control unit housing, said housings formed with a rearwardly inclined portion having a bearing and an end plate, an end cap attached exteriorly of the plate to form a final drive casing, countershafts within the housings, a brake drum fixed on each shaft adjacent its outer end and disposed within the housing, a pinion fixed on each shaft and disposed in the final drive casing, a through shaft spanning the inclined portions and mounted in the bearings thereof, sleeve hubs on the extremities of said shaft, a pair of wheels carried by each hub, one being a gear disposed within the final drive casing and meshing with the pinion on the countershaft and the other being a track drive sprocket.

3. In a vehicle, a rear assembly embodying axle housings adapted to be secured one to each side of a central power control unit housing, said housings formed with a rearwardly inclined portion having a bearing and an end plate, an end cap attached exteriorly of the plate to form a final drive casing, counter-shafts within the housings, a pinion fixed on each shaft and disposed in the final drive casing, a through shaft spanning the inclined portions and mounted in the bearings thereof, sleeve hubs on the exremities of said shaft, and a pair of wheels carried by each hub, one being a gear and disposed within the final drive casing and meshing with the pinion on the counter-shaft and the other being a track drive sprocket.

4. In a vehicle, a rear assembly embodying axle housings adapted to be secured one to each side of a central housing, said housings formed with a rearwardly inclined portion, an end plate on each housing, an end cap attached exteriorly of the plate to form a final drive casing, counter-shafts within the housings, a pinion fixed on each shaft and disposed in the final drive casing, a gear wheel in said casings meshing with the pinion, a sleeve hub to which the gear wheel is attached, means for supporting said hubs, driven wheels secured to the hubs exteriorly of the casings, and means whereby a supporting truck frame may be attached to each axle housing when the vehicle is equipped with self-laying track units.

5. In a vehicle, a rear assembly embodying axle housings adapted to be secured one to each side of a central housing, said housings formed at their outer ends with extending portions, a final drive casing formed by the end piece of each housing, countershafts within the housings, a brake drum fixed on each shaft and disposed in a pocket in the outer ends of the housing, a pinion fixed on each shaft and disposed in the final drive casing, a gear wheel in said casing meshing with the pinion, a through shaft exterior of the axle housings but passing through their extending portions for supporting said gear wheels, wheels supported by said through shaft exteriorly of the casing and mounted to be rotated with the gear wheels, and means whereby a supporting truck frame may be attached to each axle housing when the vehicle is equipped with self-laying track units.

6. In a vehicle, a rear assembly embodying axle housings adapted to be secured one to each side of a central housing, said housings formed at their outer ends with extending portions, a final drive casing formed by the end piece of each housing, counter-shafts within the housings, a brake drum fixed on each shaft and disposed in a pocket in the outer ends of the housing, a pinion fixed on each shaft and disposed in the final drive casing, a gear wheel in said casing meshing with the pinion, a through shaft exterior of the axle housings but passing through their extending portions for supporting said gear wheels, and wheels supported by said through shaft exteriorly of the casing and mounted to be rotated with the gear wheels.

7. In a vehicle, a rear assembly embodying axle housings adapted to be secured one to each side of a central housing, said housings formed at their outer ends with extending portions, a final drive casing formed by the end piece of each housing, counter-shafts within the housings, a pinion fixed on each shaft and disposed in the final drive casing, a gear wheel in said casing meshing with the pinion, a through shaft exterior of the axle housings but passing through their extending portions for supporting said gear wheels, and wheels supported by said through shaft exteriorly of the casing and mounted to be rotated with the gear wheels.

EMIL F. NORELIUS.